Figure 5:
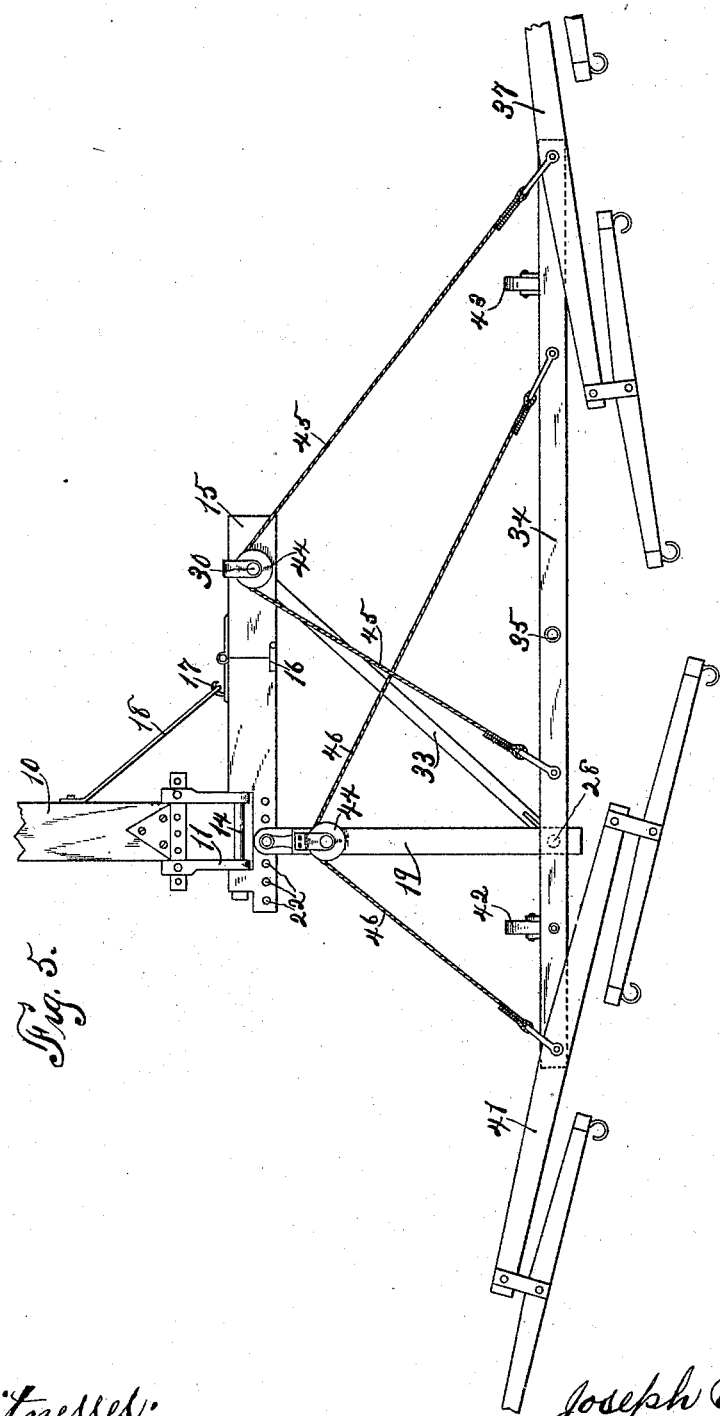

(No Model.) 2 Sheets—Sheet 1.
J. W. GAMBLE.
DRAFT EQUALIZER.
No. 505,398. Patented Sept. 19, 1893.
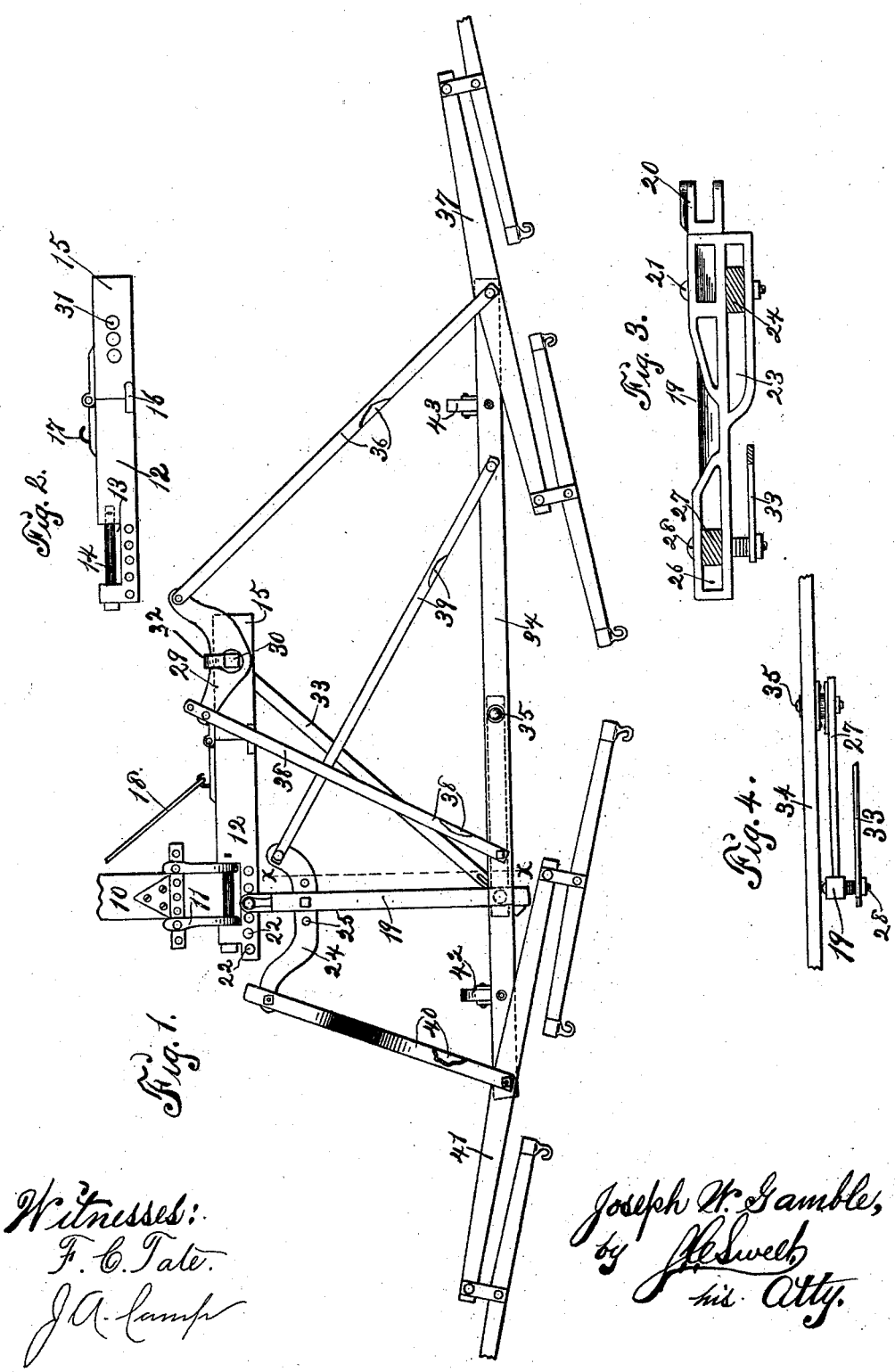
Witnesses:
F. C. Tate.
J. A. Camp
Joseph W. Gamble,
by J. E. Swett,
his Atty.

(No Model.) 2 Sheets—Sheet 2.

J. W. GAMBLE.
DRAFT EQUALIZER.

No. 505,398. Patented Sept. 19, 1893.

Witnesses:
J. A. Camp
M. O. Sweet

Joseph W. Gamble,
by J. C. Sweet,
his Atty.

UNITED STATES PATENT OFFICE.

JOSEPH W. GAMBLE, OF DES MOINES, IOWA.

DRAFT-EQUALIZER.

SPECIFICATION forming part of Letters Patent No. 505,398, dated September 19, 1893.

Application filed January 3, 1893. Serial No. 457,002. (No model.)

*To all whom it may concern:*

Be it known that I, JOSEPH W. GAMBLE, a citizen of the United States of America, residing at Des Moines, in the county of Polk and State of Iowa, have invented certain new and useful Improvements in Draft-Equalizers for Plows, of which the following is a specification.

The object of my invention is to provide a four-horse equalizer for plows, in which the side-draft on the plow is entirely overcome, and each horse draws the same weight as each other, and to avoid the necessity of providing auxiliary means to prevent the plow from taking too much land.

A further object of my invention is to provide a four-horse equalizer in the use of which one horse walks in the furrow and three on the land-side, and in which the outer team is prevented from crowding the inner team upon the plowed ground.

My invention consists in so constructing a four-horse equalizer as to have two points of draft, one point of draft for each team, the connections between the whiffle-trees and points of draft overlapping each other in such a manner as that the draft is divided, one team pulling one half from each point of draft and the remaining team pulling the other half.

My invention consists further in a draft equalizer in which the draft is divided with two points differentially arranged laterally relative to the point of the plow.

My invention consists further in a draft equalizer in which are provided two points of draft, one adjacent to the line of draft of the plow and the other point at a considerable distance to one side thereof, and connections between the points of draft and the whiffle-trees, which connections are so crossed as to provide that each team shall draw a portion of the load from each point of draft.

My invention consists further in the provision of means whereby the pulling of the four horses is applied to two different points of draft, which points are rigidly connected with each other and flexibly connected with the plow, which points of draft are located at a convenient distance of separation.

My invention consists further in the construction, arrangement and combination of parts hereinafter set forth, pointed out in my claims, and illustrated by the accompanying drawings, in which—

Figure 1 is a plan view of the complete equalizer. Fig. 2 is a detail view of a bracket and hinged clevis. Fig. 3 is a detail sectional view on the line $x$—$x$ of Fig. 1. Fig. 4 is a detail view of a portion of the brace bar and connecting parts. Fig. 5 is a plan view of a modified form of construction.

In the construction of the device as shown, the numeral 10 designates the plow-beam and 11 the plow-clevis, which are of common form.

The numeral 12 designates a bracket or hinged clevis, (Fig. 2,) provided with a notch at 13 to receive the plow clevis, which plow clevis is secured to the bracket clevis by means of the pin 14. The outer end 15 of the bracket clevis is hinged to the main portion thereof by a hinge formed on the rear side of said portions, the abutting ends of said portions being square, and a projection 16 is formed on the portion 15, which projection fits within a corresponding notch in the abutting end of the portion 12. A hook 17 is formed on the portion 12, to which hook is connected a rod or brace 18, the other end of which brace is secured to the plow beam 10 or plow clevis 11.

The numeral 19 designates a tongue clevis, (Fig. 3,) provided with a rearwardly extending portion 20, bifurcated at its rear end and adapted for attachment to the bracket clevis 12 by means of a bolt 21, which said means of attachment it will be observed is adjustable laterally, and the vertical apertures 22 in the clevis 12 provide for such adjustment. A horizontal transverse slot 23 is provided in the clevis 19, and an evener bar 24, curved as shown and provided with the vertical apertures 25, is mounted within said slot and is retained therein by means of the bolt 21. A horizontal transverse slot 26 is provided in the forward end portion of the clevis 19, in which slot is transversely mounted one end of the hinged plate 27, which hinged plate is secured thereon by means of the bolt 28.

Mounted upon the portion 15 of the bracket clevis is an evener bar 29, curved as shown, which evener bar is secured by means of the bolt 30, which bolt is adjustable in the apertures 31. A clevis 32, of common form, is provided and is secured upon the portion 15 of the bracket clevis by means of the bolt 30, in such a manner as to bind the evener bar 29 and a brace 33 upon said bracket clevis. The brace 33 extends from its point of attachment to the bracket clevis diagonally forward to the tongue clevis 19, the forward end of said brace being provided with a slot through which the bolt 28 is inserted and passed, thus providing a sliding connection between said brace and the tongue clevis.

A brace bar 34 is provided, which extends transversely of the line of draft of the plow in a plane parallel of the normal plane of the bracket 12, to which brace bar is secured by means of the bolt 35 the outer end portion of the hinged plate 27, the remaining end of said hinged plate being secured as before described to the tongue clevis.

Drawrods 36—36, are secured by one end to the outer end of the evener bar 29 and at the other end to the outer end of the brace bar 34, at which latter point is pivoted the whiffletrees 37. Drawrods 38—38, are adjustably connected at one end to the inner end of the evener bar 29, and extend therefrom to a point of attachment at the other end with the brace bar 34, which point of attachment is adjacent to the forward end of the tongue clevis, and intermediate of the point of connection between the hinged plate and tongue clevis and the point of connection between the hinged plate and the brace-bar. Draw-rods 39—39, are connected at one end to the inner end of the evener bar 24 and extend therefrom across the draw-rods 38—38 to a point of attachment to the brace-bar 34 adjacent to the forward end of the draw-rods 36. Draw-rods 40—40, are pivoted at their outer ends to the evener bar 24, at which point of attachment they are secured conjunctively with the whiffletree 41. Swiveled beneath the brace-bar 34, near the opposite ends thereof are caster wheels 42—43, which caster wheels serve to support the brace-bar and whiffletrees and prevent the same from dragging upon the ground in turning a corner or at other times when the draft is relaxed.

In the practical operation of my invention, the draft of the teams is applied to the whiffletrees 37—41, respectively, the off horse on the whiffletree 41 walking in the furrow, the remaining three horses walking on the unplowed land. The draft from the whiffletrees 37, is applied through the draw-rods 36 and the end of the brace-bar 34 to the outer end of the evener bar 29, and through the medium of said evener bar to the bracket clevis 12, from thence to the plow, the rigid tendency of this draft being to draw the plow onto the plowed ground. The draft of the whiffletrees 37 is applied in addition to the manner just described, to the inner end of the evener bar 24 through the medium of the brace 34 and the draw-rods 39 connected to said brace-bar, the rigid tendency of the latter draft being to draw the plow toward the landside. The draft of the whiffletrees 41 is applied through the medium of the adjacent end of the brace-bar 34 and the draw-rod 40 to the outer end of the evener bar 24, through said evener bar to the tongue clevis 19 and thence to the plow, the rigid tendency of which draft would be to draw the plow onto the plowed ground. The draft from the whiffletree 41 is applied in addition to the manner just described, through the medium of the brace-bar 34 and the draw-rods 38 to the inner end of the evener bar 29, through said evener bar to the bracket clevis, thence to the plow, the tendency of which draft would be to draw the plow into the landside. It will thus be observed that by reason of the closeness of the lines of draft each team tends to draw the plow in a straight line, and both teams together would, if the leverage were equal, draw the plow in a straight line, but the leverage being unequal, two of the horses being on one side of the center of draft and one only on the remaining side of the center of draft it is necessary that some means be provided for equalizing the leverage. This is done by the employment of the tongue clevis extending to a point beyond the brace bar 34 and a flexible connection between the center of said brace bar and the outer end of said tongue clevis, assisted and supplemented by the rigid connection afforded by the brace 33 between the outer end of the tongue clevis and the bracket clevis 12.

It will be observed that were it not for the brace 33 the brace-bar 34 would be drawn toward the plowed ground, and carry with it the forward end of the tongue clevis 19, the plow at the same time having a tendency to draw against the land-side, but by reason of the employment of said brace 33 a practically rigid connection is provided between the plow tongue clevis and brace-bar through the medium of the bracket clevis 12 and the hinged plate 27. A practically rigid connection is provided by the rod 18 between the bracket clevis 12 and the plow beam, which affords a draft supplemental to the draft of the plow clevis and removing the strain from the inner end of the pin 14.

In turning the corner of the land the turning of the plow is performed in the following manner: The horses are stopped, the traces slacked and the teams swung around to the land-side, the bracket clevis swinging on its hinge and permitting of the positioning of the teams without turning the plow. The teams are then started forward and immediately upon the application of the draft the plow turns upon its point by reason of the draft from the whiffletrees 41 and the draft from the whiffletrees 37 and 41 closes the hinge of the bracket clevis 12 and brings the same into an operative position.

In the construction of the device illustrated in Fig. 5 the draw-rods and evener bars are omitted, and sheaves 44, are substituted for the evener bars, and cables 45—46, are substituted for the draw-rods, the operation being exactly the same.

It will be observed that by reason of the arrangement and construction of the several parts, the horse walking in the furrow will draw just one fourth of the entire load, and the four horses pulling together advance the plow in parallel line without crowding the land-side or encroaching upon the plowed ground.

Having thus described my invention, what I claim as new therein, and desire to secure Letters Patent of the United States therefor, is—

1. A four-horse equalizer for plows comprising a bracket clevis connected to and extending transversely of a plow beam, an evener pivotally mounted on said bracket clevis, a tongue clevis connected to said bracket clevis, an evener pivotally mounted on said tongue clevis, a plurality of whiffletrees, and draw-rods forming connections between said eveners and whiffletrees.

2. In a four-horse equalizer for plows the combination of a bracket clevis arranged transversely of the line of draft, a tongue clevis connected to said bracket clevis, a brace connecting the outer ends of said clevises with each other, a brace-bar parallel with said bracket clevis, flexible connections between the tongue clevis and brace-bar, and connections between the brace bar and bracket clevis.

3. In a four horse equalizer for plows the combination of a bracket clevis arranged transversely of the line of draft, a tongue clevis connected to said bracket clevis, a brace connecting the outer ends of said clevises with each other, a brace-bar parallel with said bracket clevis, flexible connections between the tongue clevis and brace bar, and eveners independently mounted on said clevises, draw-rods connecting said eveners and brace-bar, and whiffletrees connected with said brace-bars.

4. In a four horse equalizer for plows the combination of a bracket clevis arranged transversely of the line of draft, a tongue clevis connected to said bracket clevis, a brace connecting the outer ends of said clevises with each other, a brace bar parallel with said bracket clevis, a hinge plate connecting said tongue clevis and brace bar and forming a flexible connection, eveners mounted on said clevises, and draw-rods connecting said eveners and brace-bar.

5. In a four-horse equalizer for plows, the combination of a hinged bracket clevis adapted for attachment to plow beams, an evener mounted on the outer end of said clevis, a tongue clevis adjustably connected to the inner end of the bracket clevis and extended approximately in alignment with the plow beam, an evener mounted on the rear portion of the tongue clevis, a brace connecting the outer ends of said clevises, a hinge plate connected at one end to the outer end of the tongue clevis, a brace bar connected approximately at its center to the remaining end of the hinge plate, whiffletrees mounted on said brace bar, draw rods extended and forming a connection between the extreme outer end of the brace bar and the extreme opposite ends of the eveners, draw-rods connected with the brace-bar intermediate of the aforesaid draw-rods and crossing each other connected to the adjacent ends of the eveners, and a brace connecting the hinged bracket clevis with the plow-beam.

6. In a four horse equalizer for plows the combination of the hinged bracket clevis adapted for attachment to the plow-beam, the tongue clevis attached to the bracket clevis, the eveners mounted on said clevises, the draw-rods connected at one end to said eveners, a brace-bar connected to the remaining ends of said draw rods, the hinge plate connecting the tongue clevis and brace bar, and a brace connecting the outer ends of said clevises, the forward end of which brace is provided with a slot forming a sliding connection with the adjacent end of the tongue clevis.

7. In a four-horse equalizer for plows the combination with the eveners and a brace-bar, of four connecting rods, two of said rods connecting the extreme outer ends of the brace-bar with the extreme outer ends of the eveners and converging toward said eveners, the two intermediate rods crossing each other and connecting the intermediate portion of the brace-bar with the adjacent ends of the evener, which connecting rods form draw-rods, whereby the draft of the brace-bar is applied to the evener.

8. A four-horse equalizer for plows comprising a bracket clevis arranged transversely of the line of draft and adapted for attachment to the plow-beam, a tongue clevis attached to and extending forward from the bracket clevis, a brace connecting the outer ends of said clevises, a brace-bar mounted on caster wheels, a hinge-bar connecting said brace bar with the forward end of the tongue clevis, sheaves mounted respectively on the tongue clevis and bracket clevis, and cables connected at each end to the brace bar, the bight of which cables is rove through said sheaves, and the inner end portions of which cables cross each other.

JOSEPH W. GAMBLE.

Witnesses:
S. C. SWEET,
J. A. CAMP.